United States Patent

Melvin et al.

[11] Patent Number: 5,779,562
[45] Date of Patent: Jul. 14, 1998

[54] MULTI-CORE, MULTI-COVER GOLF BALL

[76] Inventors: Terrence Melvin, 24 Fox Hollow Rd., Somers, Conn. 06071; Michael J. Sullivan, 58 Marlborough St., Chicopee, Mass. 01020; R. Dennis Nesbitt, 70 Deer Path La., Westfield, Mass. 01085

[21] Appl. No.: 840,392

[22] Filed: Apr. 29, 1997

Related U.S. Application Data

[63] Continuation-in-part of Ser. No. 631,613, Apr. 10, 1996, which is a continuation-in-part of Ser. No. 591,046, Jan. 25, 1996, which is a continuation-in-part of Ser. No. 542,793, Oct. 13, 1995, which is a continuation-in-part of Ser. No. 070,510, Jun. 1, 1993.

[51] Int. Cl.$^6$ ............................. A63B 37/12; A63B 37/06
[52] U.S. Cl. .......................... 473/373; 473/374; 473/376; 473/378
[58] Field of Search ............................. 473/373, 374, 473/376, 378

[56] References Cited

U.S. PATENT DOCUMENTS

| | | | |
|---|---|---|---|
| 4,431,193 | 2/1984 | Nesbitt | 273/235 |
| 4,625,964 | 12/1986 | Yamada | 273/62 |
| 4,650,193 | 3/1987 | Molitor et al. | 273/228 |
| 4,674,751 | 6/1987 | Molitor et al. | 273/235 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,858,924 | 8/1989 | Saito et al. | 273/62 |
| 4,863,167 | 9/1989 | Matsuki et al. | 273/62 |
| 4,911,451 | 3/1990 | Sullivan et al. | 273/235 |
| 4,919,434 | 4/1990 | Saito | 273/235 |
| 4,986,545 | 1/1991 | Sullivan | 273/235 |
| 4,998,734 | 3/1991 | Meyer | 273/235 |
| 5,002,281 | 3/1991 | Nakahara et al. | 273/220 |
| 5,048,838 | 9/1991 | Chikaraishi et al. | 273/228 |
| 5,072,944 | 12/1991 | Nakahara et al. | 273/220 |
| 5,098,105 | 3/1992 | Sullivan | 273/235 |
| 5,104,126 | 4/1992 | Gentiluomo | 273/228 |
| 5,120,791 | 6/1992 | Sullivan | 525/196 |
| 5,184,828 | 2/1993 | Kim et al. | 273/228 |
| 5,187,013 | 2/1993 | Sullivan | 428/407 |
| 5,273,286 | 12/1993 | Sun | 273/228 |
| 5,334,673 | 8/1994 | Wu | 273/235 |
| 5,368,304 | 11/1994 | Sullivan et al. | 273/220 |
| 5,482,285 | 1/1996 | Yabuki et al. | 273/228 |
| 5,490,674 | 2/1996 | Hamada et al. | 273/228 |
| 5,688,191 | 11/1997 | Cavallaro et al. | 473/373 |
| 5,713,802 | 2/1998 | Moriyama et al. | 473/374 |

FOREIGN PATENT DOCUMENTS

| | | | |
|---|---|---|---|
| WO 96/40382 A1 | 12/1996 | WIPO | A63B 37/08 |
| WO 96/40516 A1 | 12/1996 | WIPO | B32B 27/40 |

*Primary Examiner*—George J. Marlo

[57] ABSTRACT

A solid golf ball comprising a solid core and a cover enclosing the core. The core includes a center core layer and an outer core layer enclosing the center core layer, the center core layer having a specific gravity that differs from the specific gravity of the outer core layer by more than 0.1. The cover includes an inner cover layer formed over the core and an outer cover layer enclosing the inner cover layer, the outer cover layer having a Shore D hardness less than that of the inner core layer and no more than 55.

18 Claims, 1 Drawing Sheet

MULTI-CORE, MULTI-COVER GOLF BALL

RELATED APPLICATIONS

This application is a continuation-in-part of U.S. patent application Ser. No. 08/631,613, filed Apr. 10, 1996, which in turn is a continuation-in-part of U.S. patent application Ser. No. 08/591,046, filed on Jan. 25, 1996, and U.S. patent application Ser. No. 08/542,793, filed on Oct. 13, 1995, which in turn is a continuation-in-part of U.S. patent application Ser. No. 08/070,510, filed on Jun. 1, 1993.

FIELD OF INVENTION

The present invention relates to golf balls and is more particularly concerned with a new and improved solid golf ball comprising both a multilayer core and a multilayer cover.

BACKGROUND OF THE INVENTION

Golf balls traditionally have been categorized in three different groups, namely, as one piece balls, multi piece (two or more pieces) solid balls, and wound (three piece) balls. The one piece ball typically is formed from a solid mass of moldable material which has been cured to develop the necessary degree of hardness. It possesses no significant difference in composition between the interior and exterior of the ball. These balls do not have an enclosing cover. One piece balls are described, for example, in U.S. Pat. No. 3,313,545, U.S. Pat. No. 3,373,123 and U.S. Pat. No. 3,384,612. The wound ball is frequently referred to as a three piece ball since it is made with a vulcanized rubber thread wound under tension around a solid or semi-solid core and thereafter enclosed in a single or multilayer covering of tough protective material. While for many years the wound ball satisfied the standards of both the U.S.G.A. and most golfers, it has several disadvantages. For example, a wound ball is difficult to manufacture due to the number of production steps required and the careful control which must be exercised in each stage of manufacture to achieve suitable roundness, velocity, rebound, "click", "feel", and the like. Additionally, the three piece wound ball typically has a balata cover which is relatively soft and flexible. Upon impact, it compresses against the surface of the club producing high spin. Consequently, the soft and flexible balata covers provide an experienced golfer with the ability to apply a spin to control the ball in flight in order to produce a draw or a fade or a backspin which causes the ball to "bite" or stop abruptly on contact with the green. Moreover, the soft balata cover produces a soft "feel" to the low handicap player. Such playability properties of workability, feel, etc. are particularly important in short iron play with low swing speeds and are exploited significantly by relatively skilled players.

Despite all the benefits of balata, balata covered balls are easily cut and/or damaged if mishit. Golf balls produced with balata or balata containing cover compositions, therefore, have a relatively short life span. As a result of this negative property, balata and its synthetic substitute, trans polyisoprene, and resin blends, have been essentially replaced as the cover materials of choice by new cover materials comprising ionomeric resins.

Conventional multi piece solid golf balls, on the other hand, include a solid resilient core having single or multiple cover layers employing different types of material molded on the core. The one piece golf ball and the solid core for a multi piece solid (nonwound) ball frequently are formed from a combination of materials such as polybutadiene and other rubbers crosslinked with zinc diacrylate or zinc dimethacrylate, and containing fillers and curing agents which are molded under high pressure and temperature to provide a ball of suitable hardness and resilience. For multi piece nonwound golf balls, the cover typically contains a substantial quantity of ionomeric resins that impart toughness and cut resistance to the covers.

Ionomeric resins are generally ionic copolymers of an olefin, such as ethylene, and a metal salt of a unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, such as durability, for golf ball cover construction. However, some of the advantages gained in increased durability have been offset to some degree by decreases in playability. This is because, although the ionomeric resins are very durable, they also tend to be quite hard when utilized for golf ball cover construction and thus lack the degree of softness required to impart the spin necessary to control the ball in flight. Since most ionomeric resins are harder than balata, the ionomeric resin covers do not compress as much against the face of the club upon impact, thereby producing less spin. In addition, the harder and more durable ionic resins lack the "feel" characteristic associated with the softer balata related covers.

As a result, while there are currently more than 50 commercial grades of ionomers available, both from DuPont and Exxon, with a wide range of properties which vary according to the type and amount of metal ions, molecular weight, composition of the base resin (i.e. relative content of ethylene and methacrylic and/or acrylic acid groups) and additive ingredients, such as reinforcement agents, etc., a great deal of research continues in order to develop a golf ball cover composition exhibiting not only the improved impact resistance and carrying distance properties produced by the "hard" ionomeric resins, but also the playability (i.e. "spin", "feel", etc.) characteristics previously associated with the "soft" balata covers, properties which are still desired by the more skilled golfer.

Consequently, a number of multi-piece solid balls have been produced to address these needs. The different types of material used to formulate the cores, covers, etc. of these balls dramatically alter the balls overall characteristics. Various structures have been suggested using multilayer cores and single layer covers wherein the core layers have different physical characteristics. For example, U.S. Pat. Nos. 4,714,253, 4,863,167 and 5,184,828 relate to three piece solid golf balls having improved rebound characteristics in order to increase flight distance. The '253 patent is directed towards differences in the hardness of the different layers. The '167 patent relates to a golf ball having a center portion and an outer layer containing a gravity filler such as tungsten or tungsten carbide so as to impart a higher specific gravity to the outer layer than that of the inner layer. Preferably, the outer layer is harder than the center portion. The '828 patent suggests that the maximum hardness must be located at the interface between the core and the mantle, and the hardness must then decrease both inwardly and outwardly.

A number of patents suggest improving the spin and feel by manipulating the core construction. For example, U.S. Pat. No. 4,625,964 relates to a solid golf ball having a core diameter not more than 32 mm, and an outer layer having a specific gravity lower than that of the core. In U.S. Pat. No. 4,650,193, it is suggested that a curable core elastomer be treated with a cure altering agent to soften an outer layer of the core. U.S. Pat. No. 5,002,281 is directed towards a three piece solid golf ball which has an inner core having a gravity greater than 1.0, but less than or equal to that of the outer shell which must be less than 1.3. U.S. Pat. Nos. 4,848,707 and 5,072,944 disclose three-piece solid golf balls having center and outer layers of different hardness. Other examples of such dual layer cores can be found in the followings patents: U.S. Pat. No. 4,781,383, U.S. Pat. No. 4,858,924, U.S. Pat. No. 5,002,281, U.S. Pat. No. 5,048,838, U.S. Pat. No. 5,104,126, U.S. Pat. No. 5,273,286, U.S. Pat. No. 5,482,285 and U.S. Pat. No. 5,490,674. All of these are directed to balls with single cover layers.

Multilayer covers containing one or more ionic resins have also been formulated in an attempt to produce a golf ball having the overall distance, playability and durability characteristics desired. This was addressed in U.S. Pat. No. 4,431,193, where a multilayered golf ball cover is described as having been produced by initially molding a first cover layer on a spherical core and then adding a second cover layer. The first or inner layer is comprised of a hard, high flexural modulus resinous material to provide a gain in coefficient of restitution while the outer layer is a comparatively soft, low flexural modulus resinous material to provide spin and control. The increase in the coefficient of restitution provides a ball which serves to attain or approach the maximum initial velocity limit of 255 feet per second, as provided by the United States Golf Association (U.S.G.A.) rules. The relatively soft, low flexural modulus outer layer provides for an advantageous "feel" and playing characteristics of a balata covered golf ball. In various attempts to produce a durable, high spin ionomeric golf ball, the golfing industry has blended the hard ionomer resins with a number of softer ionomer resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid and an acrylate ester. It has been found that golf ball covers formed from hard-soft ionomer blends tend to become scuffed more readily than covers made of hard ionomer alone.

Most professional golfers and good amateur golfers desire a golf ball that provides distance when hit off a driver, control and stopping ability on full iron shots, and high spin for short "touch and feel" shots. Many conventional two piece and thread wound performance golf balls have undesirable high spin rates on full shots. The excessive spin on full shots is a sacrifice made in order to achieve more spin on the shorter touch shots.

A dual core, dual cover ball is described in U.S. Pat. No. 4,919,434. However, the patent emphasizes the hardness characteristics of all layers, particularly the requirement for a soft inner cover layer and a hard outer cover layer. With respect to the core, it requires that the layers should not differ in hardness by more than 10 percent and should be elastomeric materials having a specific deformation range under a constant load.

The multi piece nonwound balls, while having an advantage with respect to cut resistance, typically have a cover that is sufficiently hard so as to provide low deformation upon impact and a small contact area between the ball and the club face. This provides a greater degree of slipperiness on the club face and, therefore, less control over the ball and greater difficulty in stopping the ball on the green when using short irons. At least some of these deficiencies are considered to result also from a large moment of inertia exhibited by the multi piece balls. It would be useful to develop a ball with a controlled moment of inertia coupled with a soft cover layer in order to provide the desired backspin when using short irons, but at the same time without adversely impacting the desired flight and roll distance of the ball when using a driver.

SUMMARY OF THE INVENTION

Accordingly, it is a feature of the present invention to provide a multi piece nonwound solid core ball where the core has a multilayer construction and the characteristics of both layers of the core are such that the moment of inertia is adjusted to either enhance or decrease the backspin when using short irons. Included in this object is the provision for a ball having the multilayer core enclosed by a multilayer cover with an appropriate cover hardness and core moment of inertia that will permit extended flight distance of the ball and good roll when using a driver coupled with a cover softness that will permit sufficient deformation to increase the contact area of the ball with the club face without subjecting the cover to undesirable cutting or abrasion.

Another feature of the present invention is the provision of a golf ball of the type described that comprises both multilayer cores and multilayer covers in such a manner as to incorporate the desirable features associated with the different categories of balls traditionally employed.

A further feature of the present invention is the provision for a golf ball core structure with an inner or center core and an outer core layer, with the inner core having a specific gravity that differs from that of the outer core layer, thereby giving the golf ball a moment of inertia differing from that of typical solid core balls. Associated with this feature is the provision for a multilayer core that is combined with a multilayer cover wherein the outer cover layer has a lower hardness value than the inner cover layer. Included within this object is the provision for a golf ball having a soft outer cover layer with good scuff resistance and cut resistance coupled with relatively high spin rates at low club head speeds.

Other advantages will be in part obvious and in part pointed out more in detail hereinafter.

The invention accordingly consists in the features of construction, combination of elements and arrangement of parts which will be exemplified in the construction hereinafter set forth.

DETAILED DESCRIPTION OF THE INVENTION

Figure 1:
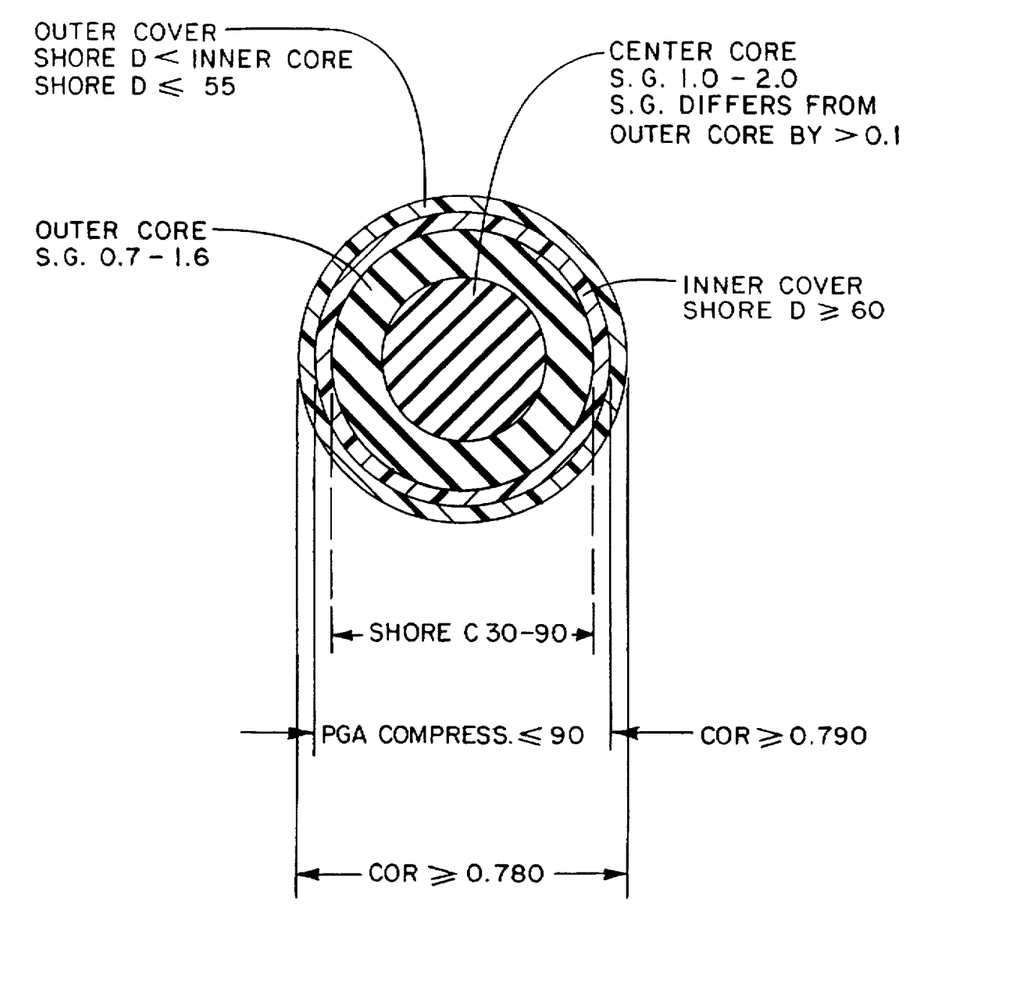
FIG. 1, is a diametrical cross sectional view of the golf ball of the invention.

The present invention relates to improved multilayer nonwound golf balls, particularly a solid golf ball comprising a multilayered solid core encased within a multilayer cover and a method for making same. The golf balls of the invention, which can be of a standard or enlarged size, have a unique combination of high coefficient of restitution, a controlled moment of inertia, and a high spin rate on short shots.

The core of the golf ball can be formed of an inner or central core layer and a solid outer core layer having not only the desired COR, compression and harness, but a significantly different specific gravity relative to the central core layer. For balls having a low moment of inertia, the central core layer has a higher specific gravity than the outer core layer. The multilayered cover comprises at least two layers: a first or inner cover layer and a softer second or outer cover layer. The cover layers can be ionomer, ionomer blends, non-ionomer, non-ionomer blends, or blends of ionomer or non-ionomer.

The core layers of the golf ball of the present invention generally are more resilient than that of the cover layers, exhibiting a PGA compression of about 85 or less, preferably about 30 to 85, and more preferably about 40–60.

The core compositions and resulting molded cores of the present invention are manufactured using relatively conventional techniques. In this regard, the core compositions of the invention preferably are based on a variety of materials, particularly the conventional rubber based materials such as cis-1,4 polybutadiene and mixtures of polybutadiene with other elastomers blended together with crosslinking agents, a free radical initiator, specific gravity controlling fillers and the like. Natural rubber, isoprene rubber, EPR, EPDM, styrene-butadiene rubber, or similar thermoset materials may be appropriately incorporated into the base rubber composed of the butadiene rubber to form the rubber component. It is preferred to use butadiene rubber as a base material of the composition for both the central core layer and the outer core layer. Thus, the same rubber composition, including the rubber base, crosslinking agent, free radical initiator, and modifying ingredients, except for the specific gravity controlling filler, can be used in both the central and outer core layers. However, different compositions can readily be used in the different layers, including thermoplastic materials such as a thermoplastic elastomer or a thermoplastic rubber, or a thermoset rubber or thermoset elastomer material. Some examples of materials suitable for use as a core layer include polyether or polyester thermoplastic urethanes as well as thermoset polyurethanes or metallocene polymers or blends thereof. For example, suitable metallocene polymers include foams of thermoplastic elastomers based on metallocene single site catalyst based foams. Such metallocene based foam resins are commercially available. A thermoset material is a rubber based, castable urethane or a silicone rubber. The silicone elastomer may be any thermoset or thermoplastic polymer comprising, at least partially, a silicone backbone. Preferably, the polymer is thermoset and is produced by intermolecular condensation of silanols. A typical example is a polydimethylsiloxane crosslinked by free radical initiators, or by the crosslinking of vinyl or allyl groups attached to the silicone through reaction with silyhydride groups, or via reactive end groups. The silicone may include a reinforcing or non-reinforcing filler. Additionally, the present invention also contemplates the use of a polymeric foam material, such as the metallocene based foamed resin.

It is preferred that the base rubber or elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized.

The crosslinking agent of the core composition is the reaction product of an unsaturated carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are the α- or β-ethylenic unsaturated acids such as acrylic acid, methacrylic acid, itaconic acid, crotonic acid, sorbic acid, and the like, and mixtures thereof. Preferably, the acid component is either acrylic or methacrylic acid. Usually, from about 15 to about 30, and preferably from about 17 to about 23 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally is amount of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed. Commercially available peroxides include n-butyl 4,4-bis (butylperoxy) valerate having a one hour half life at about 112° C., and 1,1-bis(t-butylperoxy-3,3,5-trimethyl cyclohexane having a one hour half life at about 129° C.

The core compositions of the present invention may additionally contain any other suitable and compatible modifying ingredients including, but not limited to, metal oxides, fatty acids, and diisocyanates and polypropylene powder resins. For example, a polymeric diisocyanate is used as an optional component in the rubber compositions. It can range from about 0 to 5 parts by weight per 100 parts by weight rubber (phr) component, and acts as a moisture scavenger. In addition, it has been found that the addition of a polypropylene powder resin allows for a reduction in the amount of crosslinking agent utilized to form the core to a normal or below normal compression.

Furthermore, because polypropylene powder resin can be added to core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a light molded core, when polypropylene is incorporated in the core compositions, relatively large amounts of higher gravity fillers may be added so long as the specific core weight limitations are met. Additional benefits may be obtained by the incorporation of relatively large amounts of higher specific gravity, inexpensive mineral fillers such as calcium carbonate, tungsten, tungsten carbide, barium sulfate, and zinc sulfate; however, the filler is not limited to these substances. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 3 to about 300 parts by weight and more preferably in amounts from about 20 to about 200 parts by weight per 100 parts rubber.

In the preferred low moment of inertia ball, the specific gravities of the core materials increase toward the center of the ball. In other words, the specific gravity of the center core is greater than the specific gravity of the outer core layer. More particularly, the typical single core has a specific gravity of about 1.2. However, according to the present invention, the center core layer has a specific gravity between about 1.5 to 1.9 and the outer core layer has a specific gravity of less than about 1.2. Where a higher moment of inertia is desirable, the specific gravity of the center core is reduced below 1.2 and that of the outer core layer is increased.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as zinc oxide, limestone, silica, mica, barytes, lithopone, zinc sulphide, talc, calcium carbonate, clays, powdered metals and alloys such as bismuth, brass, bronze, cobalt, copper, iron, nickel, tungsten, aluminum, tin, etc. Limestone is ground calcium/magnesium carbonate and is used because it is an inexpensive, heavy filler.

Since the specific gravity of the inner core is required to be adjusted upwardly relative to the specific gravity of the outer core so as to provide a low moment of inertia ball and at the same time set the total weight of the entire core in a specific range, the amount of the filler can vary widely. Of course, it is also possible to provide an outer core layer with a light-weight filler material, such as hollow resin particles, hollow glass particles or other low specific gravity particles, a foamed rubber, a foamed resin, or the like to achieve a similar result.

The use of foamed resins including foamed metallocene polymers allows for adjustment in the density or mass distribution of the ball to adjust the moment of inertia, and thus the spin rate and performance of the ball. Foamed materials also offer a potential cost savings due to the reduced use of polymeric material. Where the center core is formed from a foamed metallocene polymer blend, the density increasing filler material can be added to the outer core layer to distribute the mass of the ball towards the outer surface and increase the moment of inertia. Conversely, where the foamed layer forms the outer core layer, the density increasing filler material can be added to the center core to decrease the moment of inertia.

Ground flash filler or regrind also may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing and increase the activity of the cure rate resulting in higher C.O.R. Generally, free fatty acids having from about 10 to about 40 carbon atoms, and preferably having from about 15 to about 20 carbon atoms, are used. Exemplary of suitable fatty acids are stearic acid, linoleic acid, and palmitic acid, as well as mixtures thereof. Exemplary of suitable metallic salts of fatty acids include zinc stearate. When included in the core compositions, the fatty acid components is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 18 parts by weight per 100 parts of rubber. Fatty acids are used when metallic salts of fatty acids are not included in the core formulation.

Diisocyanates may also be optionally included in the core compositions. When utilized, the diiosyanates are included in amounts of from about 0.2 to about 5.0 parts by weight based on 100 parts rubber. Exemplary of suitable diisocyanates is 4,4'-diphenylmethane diiosyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and mounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, about 2 to 50 and preferably 5 to 25 parts by weight of at least one metallic salt of an unsaturated carboxylic acid, and 0.5 to 10 and preferably 1 to 5 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, powdered metals, etc. may be added to the core compositions to adjust the finished weight of the ball as necessary in order to have the finished molded ball (core, cover and coatings) closely approach the U.S.G.A. weight limit of 1.620 ounces.

As will be appreciated, the specific gravity controlling filler may be added to only the outer core layer where a higher specific gravity is required in that layer relative to the central core layer. In most instances, the difference in specific gravity between the core layers should be greater than 0.1 and preferably at least about 0.2 or more, i.e. up to about 0.6, with the higher differentials being provided in those balls having the higher specific gravity in the center core layer. The specific gravity of the center core may vary from about 1.0 to about 2.0 while the specific gravity of the outer core layer varies from about 0.7 to about 1.6. The preferred range of specific gravity for the center core is between about 1.5 and 1.9 when a very low moment of inertia is desired and the center core has a higher specific gravity than the outer core layer. In that instance the outer core layer has a specific gravity in the range of about 0.8 to 1.2. Conversely, when the outer core layer has the higher specific gravity, the preferred range of specific gravity for the outer core layer is between about 1.2 and 1.6, and that of the center core is about 1.0 to 1.2.

The outer diameter of the center core and the outer diameter of the outer core (core diameter) may vary. However, the center core has a diameter of about 10 to 35 mm and preferably about 18 to 28 mm while the outer core has a diameter of about 30 to 40 mm and preferably 35 to 38 mm, depending on the size of the center core and the finished size of the ball. Typically the center core diameter is about 20–25 mm.

The core having a two-layer structure composed of the inner core and the outer core is referred to as the solid core in the present invention. The above expression is in contrast to the thread-wound core (core formed by winding a rubber thread around the center portion which is solid or filled with a liquid material). However, as is apparent from the fact that a foamed material may be used as the outer core layer, the core is not always required to be solid.

The double cores of the inventive golf balls typically have a coefficient of restitution of about 0.730 or more, more preferably 0.770 or more and a PGA compression of about 90 or less, and more preferably 70 or less. The double cores have a weight of 25–40 grams and preferably 30–40 grams and a Shore C hardness of less than 80, with the preferred Shore C hardness being about 50–75. Generally, 5 parts of zinc oxide are used to activate the cure system of the core compound. Amounts larger than 5 parts of zinc oxide are used to increase the core weight so that the finished ball more closely approaches the upper limit of 1.620 ounces.

In producing golf ball cores utilizing the present compositions, the ingredients may be intimately mixed using, for example, two roll mills or a Banbury® mixer until the composition is uniform, usually over a period of from about 5 to about 20 minutes. The sequence of addition of the components is not critical. A preferred blending sequence is as follows.

The elastomer, crosslinking agent, fillers, zinc salt, metal oxide, fatty acid, and the metallic dithiocarbamate (if desired), surfactant (if desired), and tin difatty acid (if desired), are blended for about 7 minutes in an internal mixer such as a Banbury® mixer. As a result of shear during mixing, the temperature rises to about 200° F. The mixing is desirably conducted in such a manner that the composition does not reach incipient polymerization temperatures during the blending of the various components. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell® preformer and slugs of the desired weight are produced. The slugs to be used for the center core layer are then subjected to compression molding at about 130° C. to about 180° C. for about 10 to 50 minutes. Note that the temperature in the molding process is not always required to be constant, and may be changed in two or more steps. In fact, the slugs or preforms for the outer core layer are frequently preheated for about one half hour at about 75° C. prior to molding.

The outer core layer is usually formed by placing a rubber composition preform mass, sheet or shell for the production of the outer core in the top and bottom hemispheres of a mold with a center core mold form therebetween and then press-molding. The resultant hemispheres are combined with the preformed center core and cured. The curing conditions in the press-molding process can be the same as in producing the center core.

The above-mentioned arrangement may vary considerably, and therefore a method of forming a half shell and adhering the same can be adopted, as well as an injection or transfer molding method.

When the outer core is formed from foamed resin the outer core is injection-molded or press-molded. In the case of injection molding, the process is carried out preferably at a temperature of 200° to 250° C. for a heating time of 2 to 20 minutes in the mold.

After molding, the molded multilayer cores are cooled, the cooling effected at room temperature for about 4 hours or in cold water for about one hour. The molded cores are subjected to a centerless grinding operation whereby a thin layer of the molded core is removed to produce a round core having a diameter of about 1.470 to 1.545 inches. Alternatively, the cores are used in the as-molded state with no grinding needed to achieve roundness.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g., injection, compression, or transfer molding. When the composition is cured by heating, the time required for heating will normally be short, generally from about 2 to about 20 minutes, depending upon the particular curing agent used and method of molding. Those of ordinary skill in the art relating to free radical curing agents for polymers are conversant with adjustments of cure times and temperatures required to effect optimum results with any specific free radical agent.

After molding, the core is removed from the mold and the surface thereof preferably is treated to facilitate adhesion thereof to the covering materials. Surface treatment can be effected by any of the several techniques known in the art, such as corona discharge, ozone treatment, sand blasting, brush tumbling, and the like. Preferably, surface treatment is effected by grinding with an abrasive wheel. The weight of the inner core is adjusted so that the total weight of the center core and the outer core layer falls within a range of 30 to 38 g.

The core is converted into a golf ball by applying the dual layer of covering material thereon, ranging in thickness from about 0.070 to about 0.130 inches and preferably from about 0.0675 to about 0.1275 inches.

The inner layer of the cover is comprised of a high acid (i.e. greater than 16 weight percent acid) ionomer resin or high acid ionomer blend. Preferably, the inner layer is comprised of a blend of two or more high acid ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost and improve processing without affecting the overall performance of the finished golf ball. The inner layer may be comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations.

Two principal properties involved in golf ball performance are resilience and hardness. Resilience is determined by the coefficient of restitution (C.O.R.), the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.), along with additional factors such as club head speed, angle of trajectory and ball configuration (i.e. dimple pattern), ball weight and size generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. Although both the core and the cover contribute to the coefficient of restitution, the present invention is directed to the enhanced coefficient of restitution (and thus travel distance) which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the U.S.G.A. specifications. Along this line, the U.S.G.A. standards indicate that a "regulation" ball cannot have an initial velocity (i.e. the speed off the striker) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e. hardness) to produce enhanced playability (i.e. spin, feel, etc.).

The hardness of the ball is a second principal property involved in the performance of a golf ball. The hardness of the ball can affect the playability of the ball on striking and the sound or "click" produced. Hardness is determined by the deformation (i.e. compression) of the ball under various load conditions applied across the ball's diameter (i.e. the lower the deformation value, the harder the material). As indicated in U.S. Pat. No. 4,674,751, softer covers permit the accomplished golfer to impart increased spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests which are described hereinafter.

It has been found that a hard inner cover layer provides for a substantial increase in resilience (i.e. enhanced distance) over known multi-layer covered balls. The softer outer cover layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer core layers and inner and outer cover layers results in a golf ball having enhanced resilience (improved travel distance) and durability (i.e. cut resistance, etc.) characteristics while maintaining and in many instances, improving the playability properties of the ball.

The combination of a hard inner cover layer with a soft, relatively low modulus ionomer, ionomer blend or other non-ionomeric thermoplastic elastomer outer cover layer provides for excellent overall coefficient of restitution (i.e. excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

The inner cover layer is harder than the outer cover layer and generally has a thickness in the range of 0.01 to 0.10 inches, preferably 0.03 to 0.07 inches for a 1.68 inch ball and 0.05 to 0.10 inches for a 1.72 inch (or more) ball. The inner cover layer has a Shore D hardness of 60 or more. It is particularly advantageous if the golf balls of the invention have an inner layer with a Shore D hardness of 65 or more. The above-described characteristics of the inner cover layer provide an inner ball having a PGA compression of 100 or less. It is found that when the inner ball has a PGA compression of 90 or less, excellent playability results.

The high acid ionomers which may be suitable for use in formulating the inner cover layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Several new metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s. and thus longer distance, can be obtained.

More preferably, it has been found that when two or more of the above-indicated high acid ionomers, particularly blends of sodium and zinc high acid ionomers, are processed to produce the covers of multi-layered golf balls, (i.e. the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the low acid ionomer resins which may be included in the inner layer cover compositions of the invention contains 16% by weight or less of a carboxylic acid.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e. the inner cover layer herein) the resulting golf balls will travel further and at an enhanced spin rate than previously known multi-layered golf balls, such an improvement is particularly noticeable in enlarged or oversized golf balls.

While the core with the hard inner cover layer formed thereon provides the multi-layer golf ball with power and distance, the outer cover layer is comparatively softer than the inner cover layer. The softness provides for the feel and playability characteristics typically associated with balata or balata-blend balls. The outer cover layer or ply is comprised of a relatively soft, low modulus (about 1,000 psi to about 10,000 psi) and low acid ionomer, an ionomer blend, a non-ionomeric thermoplastic or thermosetting material such as, but not limited to, a metallocene catalyzed polyolefin such as EXACT material available from EXXON, a polyurethane, a polyester elastomer such as that marketed by DuPont under the trademark Hytrel®, or a polyester amide such as that marketed by Elf Atochem S.A. under the trademark Pebax®, a blend of two or more non-ionomeric thermoplastic or thermosetting materials, or a blend of one or more ionomers and one or more non-ionomeric thermoplastic materials. The outer layer is fairly thin (i.e. from about 0.010 to about 0.10 inches in thickness, more desirably 0.03 to 0.06 inches in thickness for a 1.680 inch ball and 0.04 to 0.07 inches in thickness for a 1.72 inch or more ball), but thick enough to achieve desired playability characteristics while minimizing expense. Thickness is defined as the average thickness of the non-dimpled areas of the outer cover layer. The outer cover layer has a Shore D hardness of 55 or less, and more preferably 50 or less.

In one embodiment, the outer cover layer preferably is formed from an ionomer which constitutes at least 75 weight % of an acrylate ester-containing ionic copolymer or blend of acrylate ester-containing ionic copolymers. This type of outer cover layer in combination with the core and inner cover layer described above results in golf ball covers having a favorable combination of durability and spin rate. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as nonlimiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, α-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%.

The one or more acrylate ester-containing ionic copolymers each has an individual Shore D hardness of about 5–64. The overall Shore D hardness of the outer cover is 55 or less, and generally is 40–55. It is preferred that the overall Shore D hardness of the outer cover is in the range of 40–50 in order to impart particularly good playability characteristics to the ball.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including ESCOR ATX (Exxon Chemical Company) or poly (ethylene-butyl acrylate-methacrylic acid) terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material.

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0.

The outer layer may include a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another α, β-unsaturated carboxylic acid, and an unsaturated monomer of the acrylate ester class having from 1 to 21 carbon atoms.

The soft ionomer is preferably made from an acrylic acid base polymer in an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e. fewer rejects) as well as significant cost savings versus the outer layer of multi-layer balls produced by other known hard-soft ionomer blends as a result of the lower overall raw materials costs and improved yields.

In addition, test data collected by the inventor indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, it has been found that a newly developed grade of an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and the Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The hard ionomer resins utilized to produce the outer cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e. the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8. Surlyn® 9910 is a copolymer of ethylene and methacrylic acid with about 15 weight percent acid which is about 58 percent neutralized with zinc ions. The average melt flow index of Surlyn® 9910 is about 0.7.

It has been determined that when hard/soft ionomer blends are used for the outer cover layer, good results are achieved when the relative combination is in a range of about 3–25 percent hard ionomer and about 75–97 percent soft ionomer.

Moreover, in alternative embodiments, the outer cover layer formulation may also comprise up to 100 wt % of a soft, low modulus non-ionomeric thermoplastic material including a polyester polyurethane such as B. F. Goodrich Company's Estane® polyester polyurethane X-4517. The non-ionomeric thermoplastic material may be blended with a soft ionomer. For example, polyamides blend well with soft ionomer.

Other soft, relatively low modulus non-ionomeric thermoplastic materials may also be utilized to produce the outer cover layer as long as the non-ionomeric thermoplastic materials produce the playability and durability characteristics desired without adversely affecting the enhanced travel distance characteristic produced by the high acid ionomer resin composition. These include, but are not limited to thermoplastic polyurethanes such as Texin thermoplastic polyurethanes from Mobay Chemical Co. and the Pellethane thermoplastic polyurethanes from Dow Chemical Co.; non-ionomeric thermoset polyurethanes including but not limited to those disclosed in U.S. Pat. No. 5,334,673; cross-linked metallocene catalyzed polyolefins; ionomer/rubber blends such as those in Spalding U.S. Pat. Nos. 4,986,545; 5,098, 105 and 5,187,013; and, Hytrel polyester elastomers from DuPont and Pebax polyesteramides from Elf Atochem S.A.

In preparing golf balls in accordance with the present invention, a hard inner cover layer is molded (by injection molding or by compression molding) about a core (preferably a solid core). A comparatively softer outer layer is molded over the inner layer.

The solid core for the multi-layer ball is about 1.2–1.6 inches in diameter, although it may be possible to use cores in the range of about 1.0–1.7 inches when the finished golf ball is oversized, i.e. 1.740 inches in diameter.

The inner cover layer which is molded over the core is about 0.01 inches to about 0.10 inches in thickness, preferably about 0.03–0.07 inches thick. The inner ball which includes the core and inner cover layer preferably has a diameter in the range of 1.25 to 1.60 inches. The outer cover layer is about 0.01 inches to about 0.10 inches in thickness. Together, the core, the inner cover layer and the outer cover layer combine to form a ball having a diameter of 1.680 inches or more, the minimum diameter permitted by the rules of the United States Golf Association and weighing no more than 1.62 ounces.

In a particularly preferred embodiment of the invention, the golf ball has a dimple pattern which provides coverage of 65% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury® type mixer, two-roll mill, or extruder prior to neutralization. After blending, neutralization then occurs in the melt or molten state in the Banbury® mixer. Mixing problems are minimal because preferably more than 75 wt %, and more preferably at least 80 wt % of the ionic copolymers in the mixture contain acrylate esters, and in this respect, most of the polymer chains in the mixture are similar to each other. The blended composition is then formed into slabs, pellets, etc., and maintained in such a state until molding is desired. Alternatively, a simple dry blend of the pelletized or granulated resins which have previously been neutralized to a desired extent and colored masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1–7 weight % masterbatch and 93–99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around the solid molded core to produce an inner ball which typically has a diameter of about 1.50 to 1.67 inches. The outer layer is subsequently molded over the inner layer to produce a golf ball having a diameter of 1.620 inches or more, preferably about 1.680 inches or more. The standards for both the minimum diameter and maximum weight of the balls are established by the United States Golf Association (U.S.G.A.).

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the dual layer core and dual layer cover, with the hard inner cover layer and the relatively softer, low flexural modulus outer cover layer, provide for an improved multi-layer golf ball which provides for desirable coefficient of restitution and durability properties while at the same time offering the feel and spin characteristics associated with soft balata and balata-like covers of the prior art.

As indicated above, the golf ball of the invention is unique in that it provides good distance when hit with a driver, good control off of irons, and excellent spin on short chip shots. This golf ball is superior to conventional soft covered two-piece or wound balls in that it has lower spin off of a driver and higher spin on short shots.

The spin rate of the ball of the invention may be tested in the manner described below.

Step 1. A golf ball testing machine is set up in order that it meets the following conditions for hitting a Top-Flite Z-balata 90 ball produced by Spalding & Evenflo Companies.

|   | Club | Launch Angle | Ball Speed | Spin Rate |
|---|------|--------------|------------|-----------|
| A | 9 iron | 21 ± 1.5 | 160.5 ± 9.0 | 9925 ± 600 |
| B | 9 iron | 28 ± 4.5 | 58.0 ± 4.0 | 4930 ± 770 |

The machine is set up such that the above conditions are met for each test using 10 Z-balata 90 golf balls which are hit 3 times each at the same machine setting. The thirty measurements of spin rate are averaged.

Step 2. Ten golf balls of the invention (Ball X) are hit 3 times each using the same machine setting as was used for the Z-balata balls and spin data is collected. Any clearly erratic spin test result is eliminated and replaced by a new test with the same ball. The thirty measurements of spin rate are averaged.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

A low moment of inertia, dual core, dual cover golf ball was formed using the following outer core and outer core compositions.

| Components | Center Core (parts by weight) | Outer Core Layer (parts by weight) |
|---|---|---|
| Polybutadiene blend | 100 | 100 |
| Zinc Oxide | 6 | 6 |
| Zinc Stearate | 15 | 15 |
| Zinc Diacrylate | 20 | 23 |

-continued

| Components | Center Core (parts by weight) | Outer Core Layer (parts by weight) |
|---|---|---|
| Tungsten Powder | 114 | — |
| Peroxide Initiator | 0.9 | 0.9 |

A center core sphere was compression molded using the above-mentioned composition in a multi-cavity mold to provide a center core diameter of about 0.85 inch. Approximately 9.4 grams of the composition was placed in each mold cavity for 12 minutes at full steam pressure to achieve 320° F. mold temperature. The centers had a specific gravity of 1.842. The resultant molded centers were trimmed and media tumbled for 45 minutes, reducing the diameter to 0.840 inch, and then dip coated in a 1% solution of a peroxide rubber adhesive in a toluene carrier to promote bonding to the outer core.

Separate hemispheric layers having a specific gravity of 1.079 were made from the outer cover material by employing approximately 13.4 grams of the outer core layer composition and preheating the material to 170° F. for approximately one-half hour. The first slugs were placed in the bottom of a multi-cavity mold and a teflon coated plate with multiple hemispheres having a diameter approximately equal to the central core size (0.840 inch diameter) was placed on top of the preformed slugs and compressed to hold the plate in place. The top half of the multi-cavity mold was also filled with preheated slugs of essentially the same weight and composition, and the combined bottom mold and teflon-coated plate mold were flipped over and placed on top of the top hemispheres. The entire assembly is then placed in a press and cold formed at room temperature using 10 tons of pressure in a hydraulic press. The mold is held in a closed position for approximately two minutes before releasing the pressure. The mold is opened and the teflon plate is removed leaving perfectly formed hemispheric shells in the cavities. The previously molded inner centers are then placed in the bottom cavities, and the top mold is reassembled and cured for about 12 minutes at 320° F., followed by ten minutes of water cooling. The resultant double core, after being centerless ground, exhibited a diameter of 1.470 inches, a weight of 32.8 grams and a C.O.R. of 0.766.

An inner cover layer then is molded on the dual layer core to provide an inner cover layer wall thickness of about 0.05 inches. The composition was an equal proportion blend of two ionomers, both of which had an 18% acid level. The inner cover layer exhibited a Shore D hardness of 70. The resulting molded intermediate balls were tested, showing a compression (Riehle) of 90 and a C.O.R. of about 0.8.

The outer cover layer had a composition comprising a blend of four different ionomers with the blend exhibiting 7.4% acid and a modulus of 66 MPa. To this material was added appropriate optical brighteners, pigments and stabilizers in minor amounts. The resultant balls had a diameter of 1.68 inches, a total weight of 45.4 grams, a compression (Riehle) of 81, and a C.O.R. of about 0.783. The outer cover layer had a cover hardness of 47 on the Shore D scale and a thickness of 0.055 inches.

The resultant balls were tested to determine spin rates for a full 9-iron and a pitch shot, as well as distance measurements using both a driver and a 5-iron. The test results are shown in Tables I, II and III, together with a comparison to a control ball. The control ball is substantially identical to the balls made in accordance with the present invention, except that it possesses only a single core having a specific gravity of 1.2. The identical cover layers were used for comparison purposes. As will be noted from the tables, the dual core, dual cover ball, when compared with the control ball, provided somewhat longer driver and 5-iron distance measurements while exhibiting substantially the same pitch spin and a slightly lower full shot spin due to the lower moment of inertia.

TABLE I

| | Core | |
|---|---|---|
| Spin Test | single | double |
| A. Pitch Shot (club head speed—60 fps) | | |
| 1) launch angle (deg.) | 27.5 | 28.0 |
| 2) ball speed (fps) | 57.7 | 57.8 |
| 3) spin rate (rpm) | 5397 | 5367 |
| 4) moment of inertia | 0.444 | 0.421 |
| B. Full 9-Iron (club head speed—125 fps) | | |
| 1) launch angle (deg.) | 23.9 | 24.6 |
| 2) ball speed (fps) | 139.7 | 139.9 |
| 3) spin rate (rpm) | 9273 | 9038 |

TABLE II

| DISTANCE REPORT | | | |
|---|---|---|---|
| TEST NUMBER: | | USING ROUNDS: | 1 |
| CLUB NAME: | 10 DEG DRIVER | CLUB HEAD SPEED | 135 fps |
| COMMENTS: | EXAMPLE I vs. CONTROL | DATE: | |
| | | # Balls/Type | 12 |

AVERAGE TEST CONDITIONS:

| | | | | | | | | |
|---|---|---|---|---|---|---|---|---|
| LAUNCH ANGLE (DEG): | 9.1 | | | | | | | |
| BALL SPEED (FPS): | 227.1 | | | | | | | |
| SPIN RATE (RPM): | 3033 | | | | | | | |
| TURF CONDITION: | FIRM | | | | | | | |
| WIND (MPH/DIR): | | | | | | | | |
| TEMP/RH (DEG %): | | | | | | | | |
| P-BAR (mbars) | | | | | | | | |

| BALL TYPE | TRAJ | F TIME | CARRY | CAR. DIFF | CTR. DEV | ROLL | T. DIST. | T. DIFF. |
|---|---|---|---|---|---|---|---|---|

TABLE II-continued

| | | DISTANCE REPORT | | | | | |
|---|---|---|---|---|---|---|---|
| CONTROL | 15.0 | 250.7 | −2.10 | 2.6 | 5.2 | 255.8 | −2.50 |
| EXAMPLE I | 15.4 | 252.8 | 0.08 | 1.1 | 5.4 | 258.3 | 0.00 |

TABLE III

DISTANCE REPORT

| TEST NUMBER: | | | USING ROUNDS: | 1 |
|---|---|---|---|---|
| CLUB NAME: | TFT 5 IRON | | CLUB HEAD SPEED | 126.60 |
| COMMENTS: | EXAMPLE I vs. CONTROL | | DATE: | |
| | | | # Balls/Type | 12 |

| AVERAGE TEST CONDITIONS: | | TEE POSITION | PRESSURE SETTINGS |
|---|---|---|---|
| LAUNCH ANGLE (DEG): | 14.7 | F/B = 16.25 | SWING = 85 |
| BALL SPEED (FPS): | 164 | L/R = 6.5 | BRAKE = 12 |
| SPIN RATE (RPM): | 5300 | | |
| TURF CONDITION: | FIRM | | |
| WIND (MPH/DIR): | 6.42  154.49 | | |
| 180 = TAILWIND | | | |
| TEMP/RH (DEG %): | 89.55  65.71 | | |
| P-BAR | 1018.14 | | |

| BALL TYPE | TRAJ | F TIME | CARRY | CAR. DIFF | CTR. DEV | ROLL | T. DIST. | T. DIFF. |
|---|---|---|---|---|---|---|---|---|
| CONTROL | 24.4 | 5.4 | 175.8 | −3.70 | 0.3 | 4.5 | 180.2 | −4.10 |
| EXAMPLE I | 24.9 | 5.3 | 179.5 | 0.00 | 1.8 | 4.8 | 184.3 | 0.00 |

EXAMPLE II

The procedure of Example I was repeated except that the composition of the center core and outer core layer were altered as follows. The center core composition comprised 100 parts by weight of a high cis-polybutadiene, 6 parts by weight of zinc oxide, 15 parts by weight of zinc stearate, 15 parts by weight of zinc diacrylate and 0.9 parts by weight of an initiator. The resultant center core had a core size of 0.84 inches and a weight of 5.17 grams after tumbling to provide appropriate surface conditions. The material exhibited a specific gravity of 1.044.

The outer core material had a composition substantially the same as the center core except that the zinc diacrylate was used in amounts of 30.5 parts by weight and tungsten powder was used in amounts of 22.8 parts by weight. The outer core material was preformed, preheated and molded into hemispheres in the same manner as Example I and exhibited a specific gravity of 1.267. The dual core was cured in the manner indicated in Example I and, after centerless grinding, exhibited a core diameter of 1.468 inches, a weight of 32.5 grams, a Riehle compression of 101 and a C.O.R. of 0.771.

The dual cover of Example I was applied to the finished cores and the resultant balls were tested for 5-iron distance. The results of the test are shown in Tables IV and V. As can be seen, the tests show that the high moment of inertia ball of the present invention provides the longest carry distance when using a mid-iron, such as the 5-iron.

It is believed this ball also has a lower spin off full shots and still has a relatively high spin on pitch shots when compared to single core, single layer balls. Thus, the multi-core, multi-cover balls expand the range of playability and feel beyond what is attained with single core balls, even those with multiple covers.

The invention has been described with reference to the preferred embodiment. Obviously, modification and alterations will occur to others upon reading and understanding the preceding detailed description. It is intended that the invention be construed as including all such modifications and alterations insofar as they come with the scope of the appended claims or the equivalents thereof.

We claim:

1. A solid golf ball comprising a solid core and a cover enclosing said core; the core comprising a center core layer and an outer core layer enclosing said center core layer, the center core layer having a specific gravity that differs from the specific gravity of the outer core layer by more than 0.1; the cover comprising an inner cover layer formed over the core and an outer cover layer enclosing the inner cover layer, the outer cover layer having a Shore D hardness less than that of the inner core layer and no more than 55.

2. The golf ball of claim 1 wherein the center core layer has a higher specific gravity than the outer core layer.

3. The golf ball of claim 1 wherein the center core layer has a lower specific gravity than the outer core layer.

4. The golf ball of claim 1 wherein said outer cover layer has a Shore D hardness of no more than 50.

5. The golf ball of claim 1 wherein said inner cover layer has a Shore D hardness of at least 60.

6. The golf ball of claim 1 wherein the specific gravity of the center core layer falls within the range of about 1.0 to about 2.0, the specific gravity of the outer core layer falls within the range of about 0.7 to about 1.6, and the difference in the specific gravity of the core layers is at least about 0.2.

7. The golf ball of claim 1 wherein at least one of said core layers includes a specific gravity controlling filler.

8. The golf ball of claim 7 wherein the specific gravity controlling filler increases the specific gravity of the core layer wherein it is incorporated.

9. The golf ball of claim 8 wherein the filler is a mineral filler.

10. The golf ball of claim 7 wherein the filler contains metallic powders.

11. The golf ball of claim 7 wherein the specific gravity controlling filler decreases the specific gravity of the core layer wherein it is incorporated.

12. The golf ball of claim 11 wherein the filler is a low specific gravity particulate material.

13. The golf ball of claim 1 wherein the lower specific gravity core layer is a foamed material.

14. The golf ball of claim 1 wherein at least one of the core layers is a thermoset elastomeric base material.

15. The golf ball of claim 14 wherein the elastomeric base material is polybutadiene.

16. The golf ball of claim 1 wherein the cover layers comprise ionomers and ionomeric blends.

17. The golf ball of claim 1 wherein the core layers have a Shore C hardness in the range of 30 to 90 and the inner cover layer has a Shore D hardness of at least 65.

18. A solid golf ball comprising a solid core and a cover enclosing said core; the core comprising a center core layer and an outer core layer enclosing said center core layer, the center core layer having a specific gravity that differs from the specific gravity of the outer core layer by more than 0.1; the cover comprising an inner cover layer formed over the core and an outer cover layer formed over the inner cover layer, the inner cover layer having a Shore D hardness of at least 65, the core with the inner cover layer formed thereon having a PGA compression of 90 or less and a coefficient of restitution of 0.790 or greater, the outer cover layer having a Shore D hardness of no more than 50, the golf ball having a coefficient of restitution of at least 0.780.

* * * * *